US009665068B2

(12) United States Patent
Lee et al.

(10) Patent No.: US 9,665,068 B2
(45) Date of Patent: May 30, 2017

(54) SMART BRACELET

(71) Applicant: LG ELECTRONICS INC., Seoul (KR)

(72) Inventors: Yongho Lee, Seoul (KR); Hyunsun Yoo, Seoul (KR); Hyungwoo Park, Seoul (KR); Sangwoo Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/753,522

(22) Filed: Jun. 29, 2015

(65) Prior Publication Data

US 2016/0070234 A1    Mar. 10, 2016

(30) Foreign Application Priority Data

Sep. 4, 2014 (KR) ........................ 10-2014-0117423

(51) Int. Cl.
*G04B 37/14* (2006.01)
*A44C 5/14* (2006.01)
*A44C 5/00* (2006.01)
*G06F 1/16* (2006.01)

(52) U.S. Cl.
CPC ........ *G04B 37/1486* (2013.01); *A44C 5/0007* (2013.01); *A44C 5/14* (2013.01); *G06F 1/163* (2013.01)

(58) Field of Classification Search
CPC  A44C 5/14; A44C 5/0007; A44C 5/24; A06F 1/163; G04C 3/00; G04C 3/004; G04C 3/008; G04G 17/00; G04B 99/00; G04B 37/1486
See application file for complete search history.

(56) References Cited

U.S. PATENT DOCUMENTS

| | | | | |
|---|---|---|---|---|
| 6,350,055 | B1* | 2/2002 | Barras | G04B 37/1486 368/276 |
| 6,619,835 | B2* | 9/2003 | Kita | A44C 5/0015 368/10 |
| 7,618,260 | B2* | 11/2009 | Daniel | A44C 5/0007 24/311 |
| 8,467,270 | B2* | 6/2013 | Gossweiler, III | G04G 17/06 345/173 |
| 8,588,032 | B2* | 11/2013 | Geyer | G04G 9/0017 368/11 |
| 9,141,086 | B1* | 9/2015 | Rohrbach | G04B 37/1486 |
| 9,152,129 | B2* | 10/2015 | Modaragamage | A44C 5/24 |
| 2001/0043514 | A1 | 11/2001 | Kita | |
| 2001/0050883 | A1 | 12/2001 | Farine et al. | |
| 2016/0094259 | A1* | 3/2016 | Hatanaka | H04B 1/385 455/90.2 |

\* cited by examiner

*Primary Examiner* — Sean Kayes
(74) *Attorney, Agent, or Firm* — Dentons US LLP

(57) ABSTRACT

There is disclosed a smart bracelet including a band having a curved surface in a longitudinal direction; a slit extended from each of both longitudinal ends of the band along the longitudinal direction, divided ends divided by the slit, a coupling hole formed in a lateral surface of the divided end, a hinge pin inserted in the coupling hole, the hinge pin comprising a conductive material, a band printed circuit board disposed in a predetermined portion of the band, the band printed circuit board where an integrated circuit (IC) is loaded, and a link unit connecting the band printed circuit board and the hinge pin with each other.

19 Claims, 18 Drawing Sheets

SMART BRACELET

CROSS-REFERENCE TO RELATED APPLICATIONS

This application claims priority to Korean Patent Application No. 10-2014-0117423 filed on Sep. 4, 2014 in Korea, the entire contents of which is hereby incorporated by reference in its entirety.

BACKGROUND OF THE DISCLOSURE

Field of the Disclosure

Embodiments of the present disclosure relate to a smart bracelet attachable to and detachable from a watch module.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Wearable mobile terminals are released which can be worn by users like accessories or glasses on wrists or eyes to be carried easily and conveniently.

Such a wearable mobile terminal is always worn on a user's body part and the wearable mobile terminal is functioned as an accessory. Accordingly, there are increasing needs for deformable type wearable mobile terminals and also needs for devices additionally loaded in conventional accessories to be used as smart mobile terminals.

SUMMARY OF THE DISCLOSURE

Accordingly, an object of the present disclosure is to provide a smart bracelet attachable to a watch module.

Embodiments of the present disclosure may provide a smart bracelet includes a band having a curved surface in a longitudinal direction; a slit extended from each of both longitudinal ends of the band along the longitudinal direction; divided ends divided by the slit; a coupling hole formed in a lateral surface of the divided end; a hinge pin inserted in the coupling hole, the hinge pin comprising a conductive material; a band printed circuit board disposed in a predetermined portion of the band, the band printed circuit board where an integrated circuit (IC) is loaded; and a link unit connecting the band printed circuit board and the hinge pin with each other.

The link unit may include an interface ring formed in an inner surface of the coupling hole; and an interface projection extended from the interface ring toward an inside of the band to be connected with the band printed circuit board.

Ends of the band may include a flexible material and the ends may be bending in a traverse direction.

The coupling hole may be extended in a traverse direction of the divided ends, and divided ends facing each other when both ends of the band face each other may be bending in a different direction and overlapped with each other in a traverse direction, and the hinge pin may pass through the coupling holes of the divided ends bending in the same direction simultaneously, to couple one end of the band to the other end of the band.

The width of the slit may be equal to the width of the divided end, and the divided ends of the other portion of the band are inserted in the slit provided in a portion of the band and the divided ends of the portion of the band are inserted in the slit provided in the other portion of the band, and the hinge pin may pass through the coupling hole formed in the portion of the band and the coupling hole formed in the end formed in the other portion of the band simultaneously to couple the one end and the other end of the band to each other.

The smart bracelet may further include a button selectively inserting the hinge pin in the coupling hole, wherein the hinge pin is projected outwardly from an inside of the band through the coupling hole.

The may further include a flexible member provided in the hinge pin to apply an elastic force in a direction where the hinge pin is projected outwardly, wherein the flexible member contracts and the hinge pin is inserted in the coupling hole, when the button is pressed, and the hinge pin is projected from the coupling hole, when the force pressing the button is removed.

The ink unit may be a plate spring curved in a U-shape, and the hinge pin may be projected from both ends of the link unit toward the coupling hole, and the button may be projected from the link unit in a lateral direction of the band, adjacent to the hinge pin.

The smart bracelet may further include a hooking portion crossing the slit; and a hook rotatably coupled to a hooking portion of a hooking portion provided in the portion of the band and selectively coupled to a hooking portion provided in the other portion of the band.

The smart bracelet may further include a watch module comprising a clock face provided in a front surface and a band coupling portion provided in both sides thereof to be coupled to the band via the hinge pin, and the band coupling portion may include a pair of band coupling projections spaced apart a distance corresponding to the width of the band from each other; and a hinge hole formed in the band coupling projection to insert the hinge pin therein.

The smart bracelet may further include a display unit coupled to a front surface of the clock face of the watch module, wherein the IC controls the display unit to be translucent or opaque partially or entirely so as to output image information on the display unit.

The IC may control a transparency level of the transparent display unit.

The IC may control an area displaying information of the transparent display unit to be translucent and the other area of the transparent display unit to be transparent.

The transparent display unit may be attachable to and detachable from the watch module.

The smart bracelet may further include a signal line connected to a predetermined portion of the transparent display unit, wherein one end of the signal line is disposed in a slit of the band to be connected with the hinge pin.

The smart bracelet may further include an audio output unit coupled to the band, wherein image information or texture message information is output via the display unit and the audio output unit when the band is coupled to the watch module, and the texture message information is output via the audio output unit when one end of the band is coupled to the other end of the band.

The band may include a first band and a second band divided in a longitudinal direction; and a length adjusting unit adjusting a distance between the first band and the second band to adjust the length of the band.

The length adjusting unit may include an auxiliary band having one end selectively inserted in and projected from the first band and the other end selectively inserted in and projected from the second band; an auxiliary band accommodating portion formed in each of the first and second bands to accommodate the auxiliary band; a stopper formed in each of both ends of the auxiliary band; and a stopping groove formed in the auxiliary band accommodating portion to insertedly stop the stopper.

The smart bracelet may further include a battery detachably provided in an outer surface of the band, the battery comprising a terminal projection; a terminal hole formed in the outer surface of the band to insert the terminal projection therein; and a flexible terminal formed in the band printed circuit board to be connected with the terminal projection. Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1:
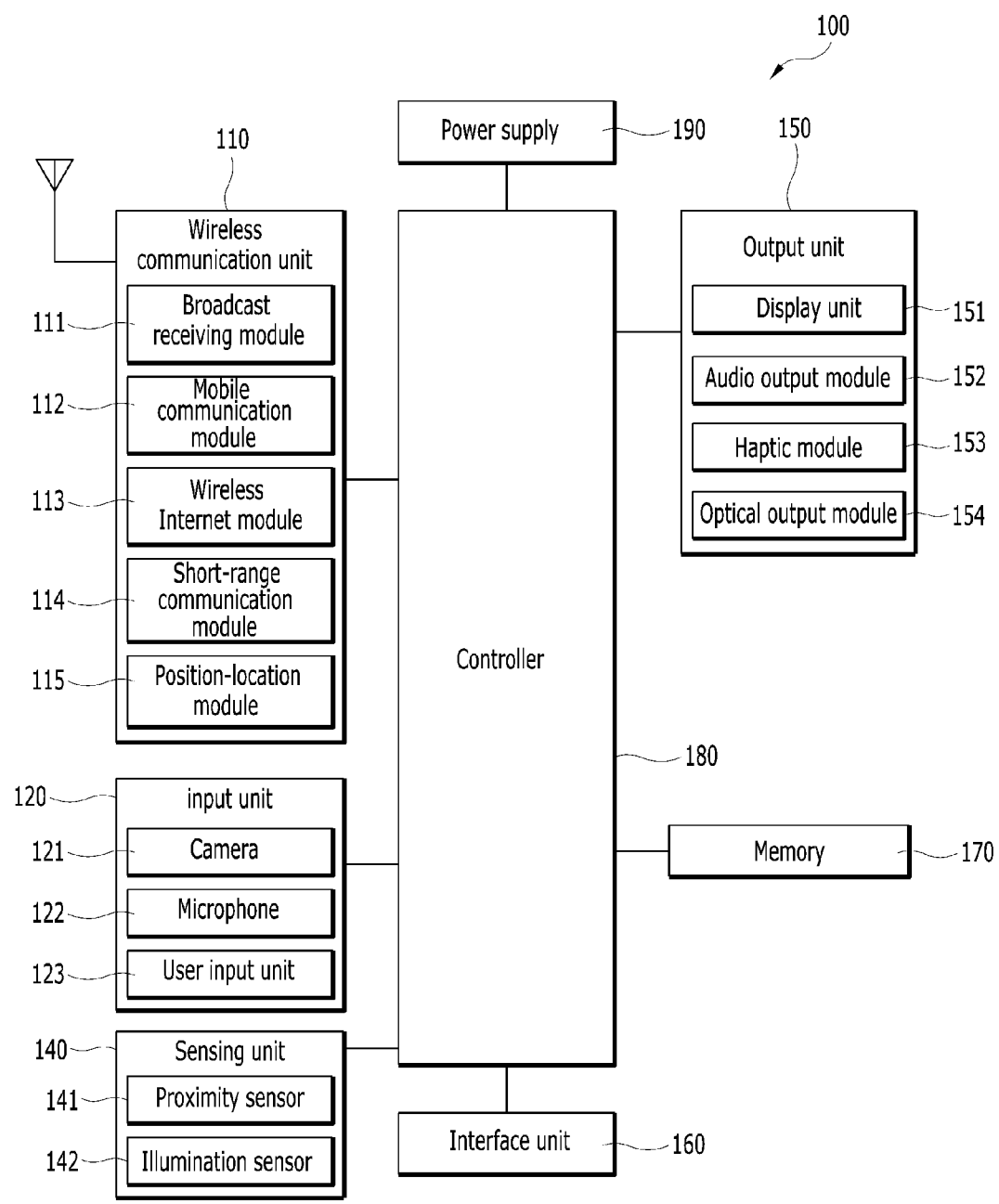
FIG. 1 is a block diagram illustrating a smart bracelet in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

A smart bracelet in accordance with the present disclosure is one of diverse mobile terminal types. The smart bracelet is a mobile terminal wearable on the user's wrist. Such the smart bracelet may include some or all of the components mentioned above. Hereinafter, features associated with a shape of the smart bracelet will be described, referring to the accompanying drawings.

Figure 2:
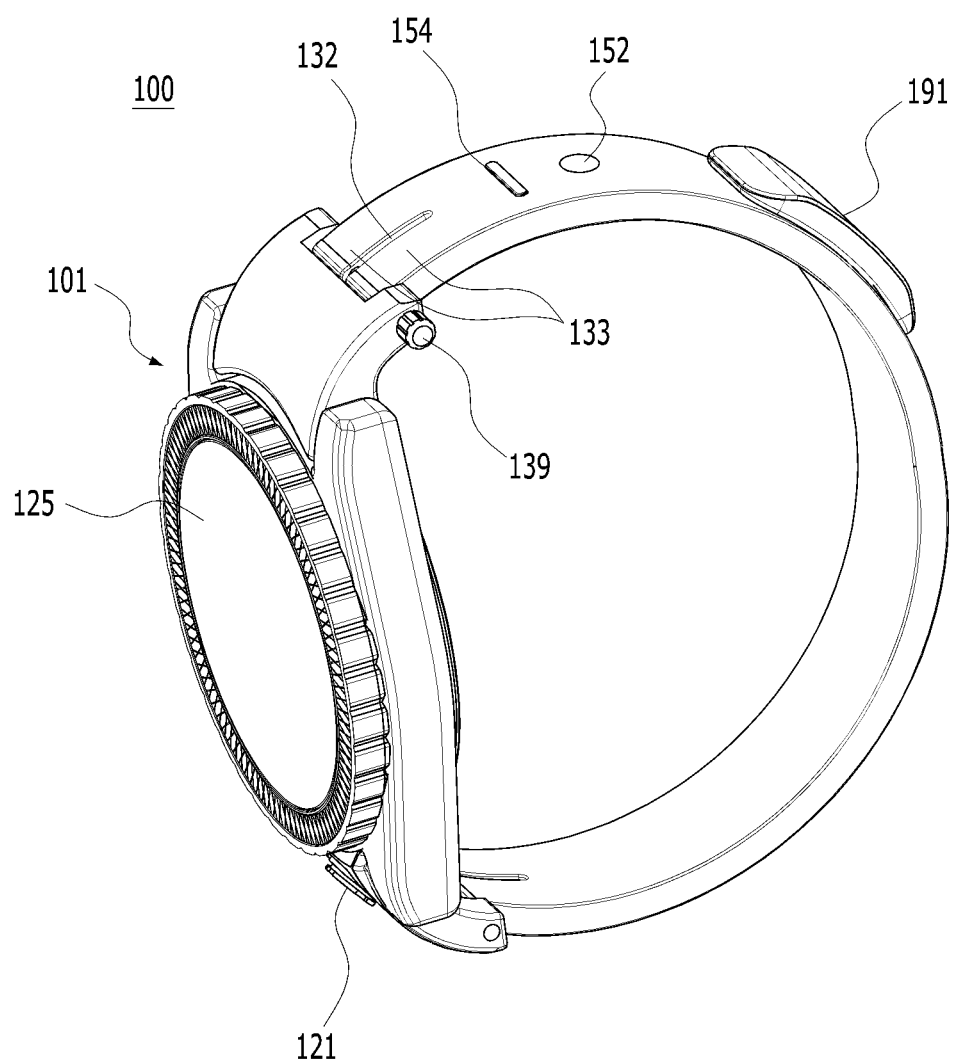
FIG. 2 is a perspective diagram illustrating a smart bracelet in accordance with one embodiment of the present disclosure.
Figure 3:
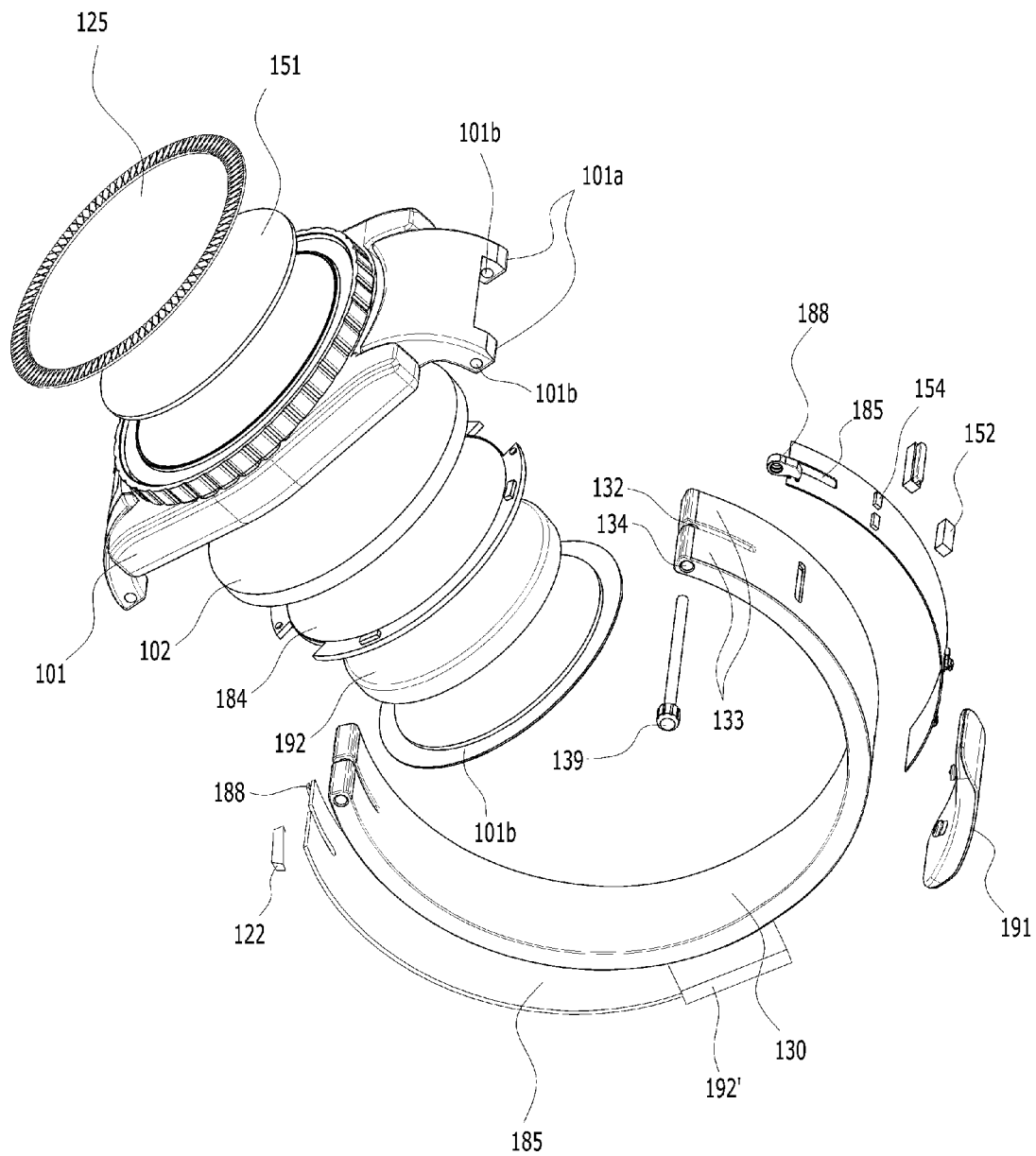
FIG. 3 is an exploded perspective diagram illustrating a smart bracelet in accordance with one embodiment of the present disclosure.

FIG. 2 is a perspective diagram illustrating a smart bracelet in accordance with one embodiment of the present disclosure. FIG. 3 is an exploded perspective diagram illustrating a smart bracelet in accordance with one embodiment of the present disclosure, the smart bracelet in accordance with the embodiment of the present disclosure includes a band 130 having a cured surface or a flexible material. The band 130 may be detachable to a watch module 101, using a hinge pin 139.

In case it is formed of a hard material, the band 130 may be formed in a curved shape. In case it is formed of a flexible material, the band 130 may be bendable, so that the band 130 can be wound around the user's wrist. An electronic control unit is provided in the band 130 and electronic components are loaded in the electronic control unit. Examples of the electronic components include a band printed circuit board 185, an audio output unit 152, a microphone 122, an optical output unit 254 and an antenna (not shown).

Figure 4A:
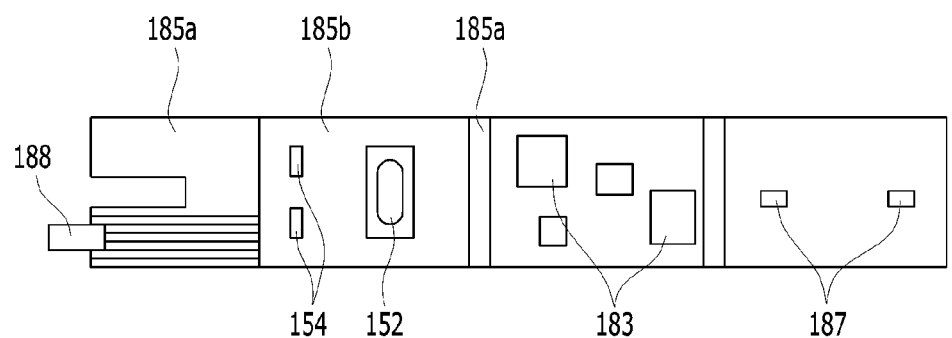
FIGS. 4a and 4b are plane views illustrating a band board of a smart bracelet in accordance with the present disclosure.
Figure 4B:
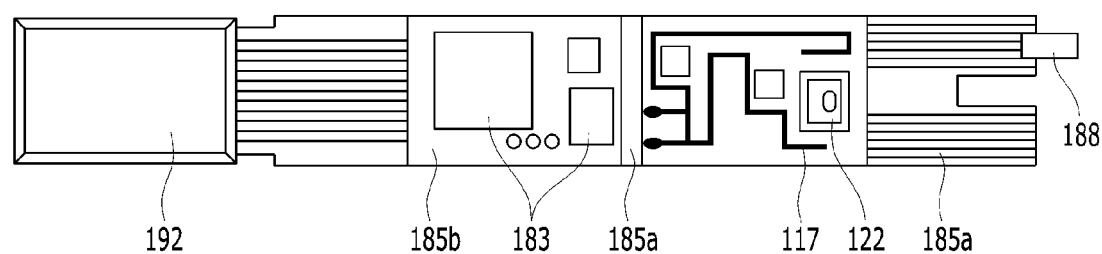

FIGS. 4a and 4b are plane views illustrating a band board of a smart bracelet in accordance with the present disclosure. The band printed circuit board includes a flexible printed circuit board. As shown in FIGS. 4a and 4b, the band printed circuit board may consist of a plurality of hard printed circuit board pieces and the flexible printed circuit board may be disposed between the printed circuit board pieces. Or, an overall area of the band printed circuit board 185 may be formed of a flexible material.

An IC 183 may be loaded in the band printed circuit board 185 to control the audio output unit 152, the microphone 122, the optical output unit 254 and the wireless communication unit 110. The IC 183 may control the watch module 101, in case it is connected to the watch module 101. The audio output unit 152, the microphone 122, the optical output unit 254 and the antenna 117 may be loaded in the band 130, independent from the band printed circuit board 185. However, those components may be loaded on the band printed circuit board 185 shown in FIGS. 4a and 4b.

The band printed circuit board 185 provided in each of side portions of the band 130 may be separated as shown in FIG. 3 or both ends of the band printed circuit boards are connected so as to form one band printed circuit board 185. In case one end of the band 130 is connected to the watch module 101 or ends of the band 130 are connected with each other, the separated band printed circuit board 185 may be connected.

The audio output unit 152, the optical output unit 254 and the IC 183 may be arranged in one band printed circuit board 185. Also, a ground for connecting the band to an external battery 191 may be arranged in the band printed circuit board. The microphone 122, the antenna 117, the IC 183 and an internal battery 193 may be loaded in the other band printed circuit board 185. The arrangement may be changeable and more components rather than the components mentioned above may be loaded.

A slip 132 may be extended from one end of the band 130 in a longitudinal direction of the band 130. The slit in this embodiment may be provided in each of both ends of the band 130. Each end of the band 130 may be divided into two divided sides 133 by each slit. When plural slits are provided, more divided sides 133 are formed.

Even in case the band 130 is formed of a hard material, the divided sides 133 may be formed of a flexible material. The divided sides 133 may be bendable upwardly and downwardly in a traverse direction of the band 130. Each of the divided sides 133 divided by the slit 132 may be bendable in a different direction.

A coupling hole 134 extended from a lateral surface of the divided sides 133 in a traverse direction may be further provided in the end of the band 130. A hinge pin 139 may be coupled to the coupling hole 134 to couple the band 130 to the watch module 101. The watch module 101 may include a hinge hole 101b to pass the hinge pin 139 there through.

Figure 5:
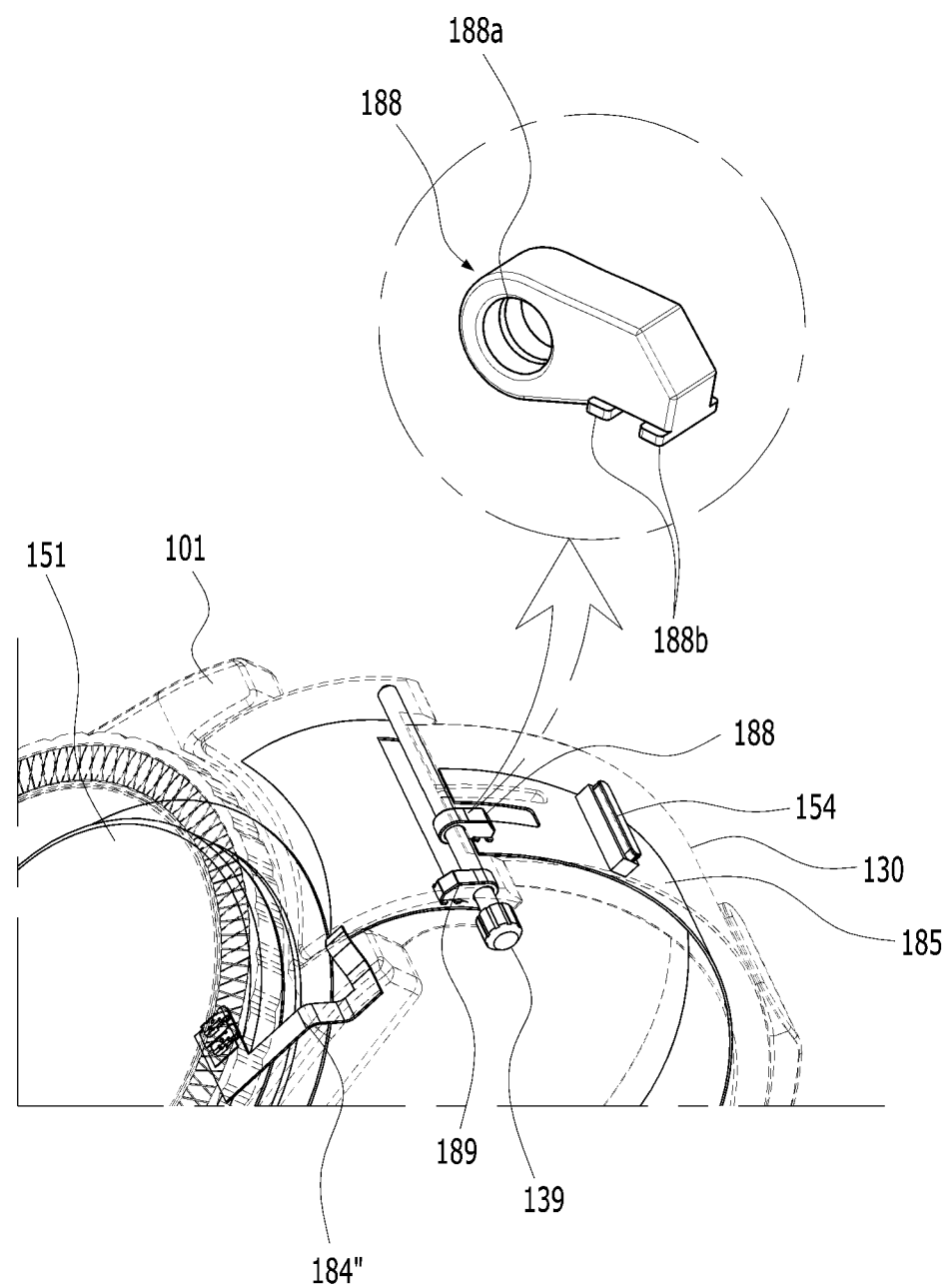
FIG. 5 is a perspective diagram illustrating a coupling portion between a watch module and a band of a smart bracelet in accordance with one embodiment.

The hinge pin penetrating the band 130 may be formed of a conductive material and it may be electrically connected to an interface ring 188a provided in the coupling hole 134 or the hinge hole 101b. FIG. 5 is a perspective diagram illustrating a coupling portion between the watch module 101 and the band 130 of the smart bracelet in accordance with one embodiment. As shown in FIG. 5, the interface ring 188a may be a ring-shaped member provided in the coupling hole 134 of the band 130, with formed of a conductive material. Interface protrusion 188b formed on the interface ring 188a is connected to the band printed circuit board 185 loaded in the band 130.

A clock face is provided in a front surface of the watch module 101 and the clock face has gradations, a an hour hand showing the hour, a second hand showing the second and the like on a clock. Band coupling units 101a are provided in both sides of the watch module 101 to couple the watch module 101 to the band 130 via the hinge pin 139. The band coupling portion 101a includes a pair of band coupling projections spaced apart a distance corresponding to the width of the band 130 and a pair of hinge holes 101b formed in the band coupling projections, respectively. As mentioned above, the hinge pin 139 is inserted in the hinge hole 101b so that the watch module 101 and the band 130 can be coupled to each other.

The watch module 101 may be a watch main body functioned as a conventional watch. Even the conventional watch includes the band coupling units 101a to change a watch band so that the band 130 can be changed, using the hinge pin 139 inserted in the hinge hole 101b of the band coupling unit 101a. Accordingly, the smart bracelet can be coupled even to the conventional watch module 101.

Even the watch module 101 having no auxiliary electronic components may include the battery 192 to drive the clock face 102. The battery 192 may be used only in the clock face 102 and the battery provided in the band 130 may be used in driving the electronic components provided in the band 130 and the display unit 151, in case the display unit 151 is additionally provided.

As shown in FIG. 3, the watch module 101 in which electronic components are loaded may be used. The watch module 101 includes a display unit 151, a circuit unit 184 for control and a main battery 192 for supplying a power. A camera 121 and the like not provided in the smart bracelet may be provided in the watch module 101.

The display unit 151 keeps a transparent status, when the watch module is used as the conventional watch and it is changed into a transparent/translucence/opaque status, only when information is output on the display unit 151. Also, a touch sensor 125 may be further provided in a front surface of the display unit 151 to facilitate input and output simultaneously on the display unit 151.

In case electronic components are loaded even in the watch module 101, an interface ring 189 may be provided in the hinge hole 101b for electrical connection with the electronic components to the band. Accordingly, the electronic components of the band may be connected to the circuit unit 184 provided in the watch module 101 via the interface ring 188a, so that the function can be expanded.

For example, when the band 130 is coupled to the watch module 101 having only the display function, call making/receiving or data transmitting/receiving may be facilitated via wireless communication or short range communication with a base station, using the antenna 117 provided in the band 130, and audio information may be also output via an audio output module 152 provided in the band 130.

The hinge pin 139 may be used not only in connecting the watch module 101 to the ends of the band 130 but also in connecting the band 130 to an external power supply to receive the power or to an external device such as a computer.

Figure 6:
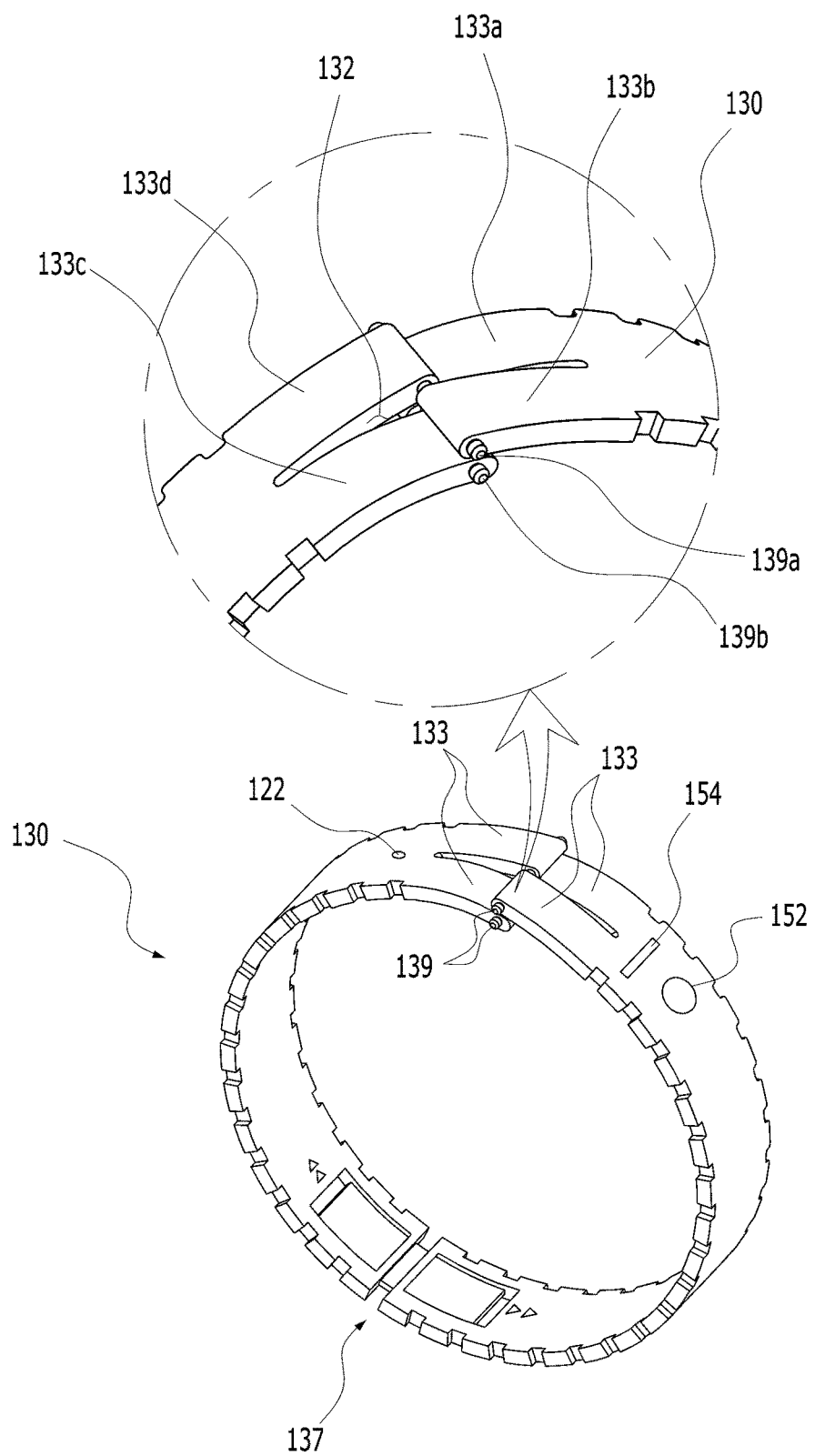
FIG. 6 is a perspective diagram illustrating a band of a smart bracelet in accordance with one embodiment of the present disclosure.

FIG. 6 is a diagram illustrating a status where only both ends of the band 130 are connected with each other to make the user wear the band 130 separated from the watch module 101 on the user's wrist. As mentioned above, the divided sides 133 may be formed of the flexible material so that they may be bending in the reverse direction with respect to the slit 132. The other divided sides 133 facing the divided ends may be also bending in the reverse direction. Accordingly, the four divided sides 133 may be double-overlapped with each other as shown in FIG. 6.

One hinge pin 139a simultaneously passes through the coupling holes 134 of the second divided side 133b of a first end of the band and the first divided side 133d of a second end of the band overlapped in an upper portion to couple the ends to each other. Another hinge pin 139b simultaneously passes through the coupling holes 134 of the first divided side 133a of a first end of the band and of a second divided side 133c of a second end of the band overlapped with each other in the lower portion to couple the ends to each other.

Figure 7:
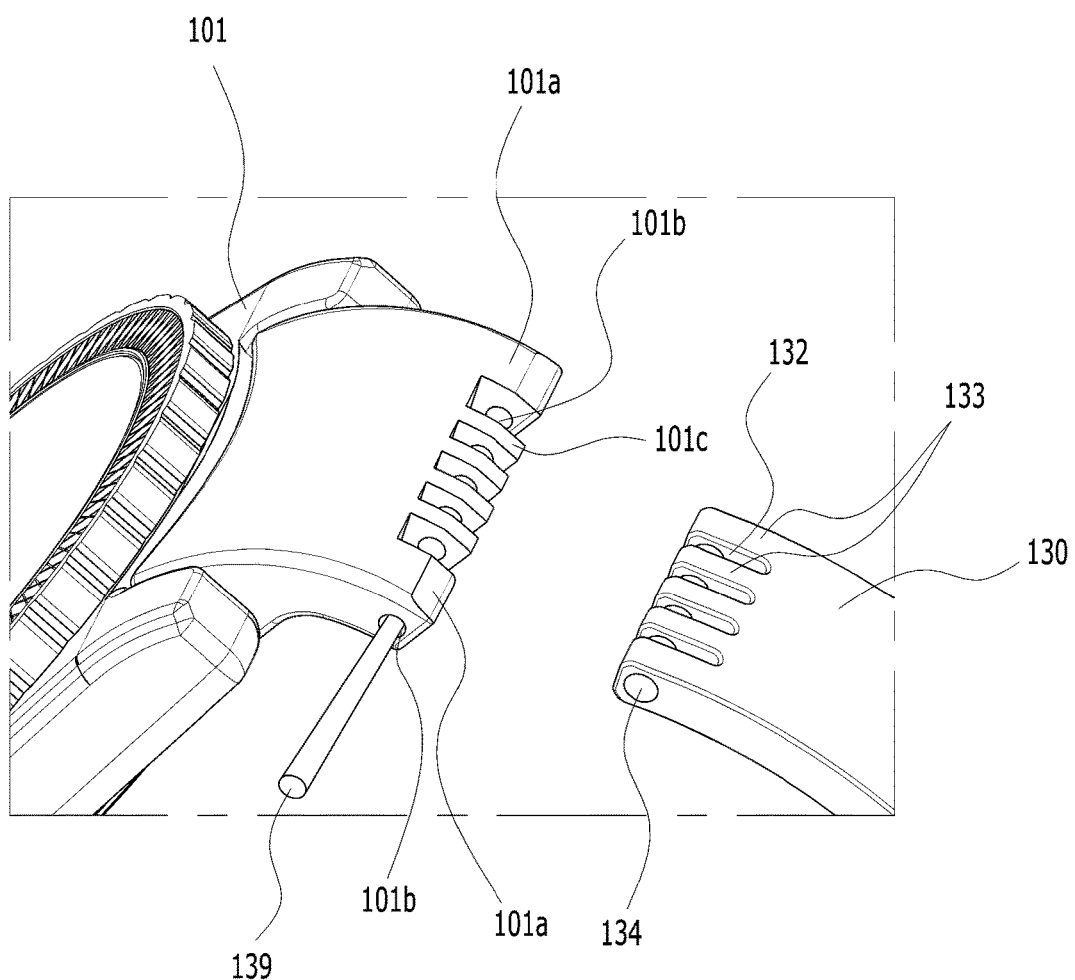
FIG. 7 is an exploded perspective diagram illustrating a coupling portion between a watch module and a band of a smart bracelet in accordance with another embodiment.
Figure 8:
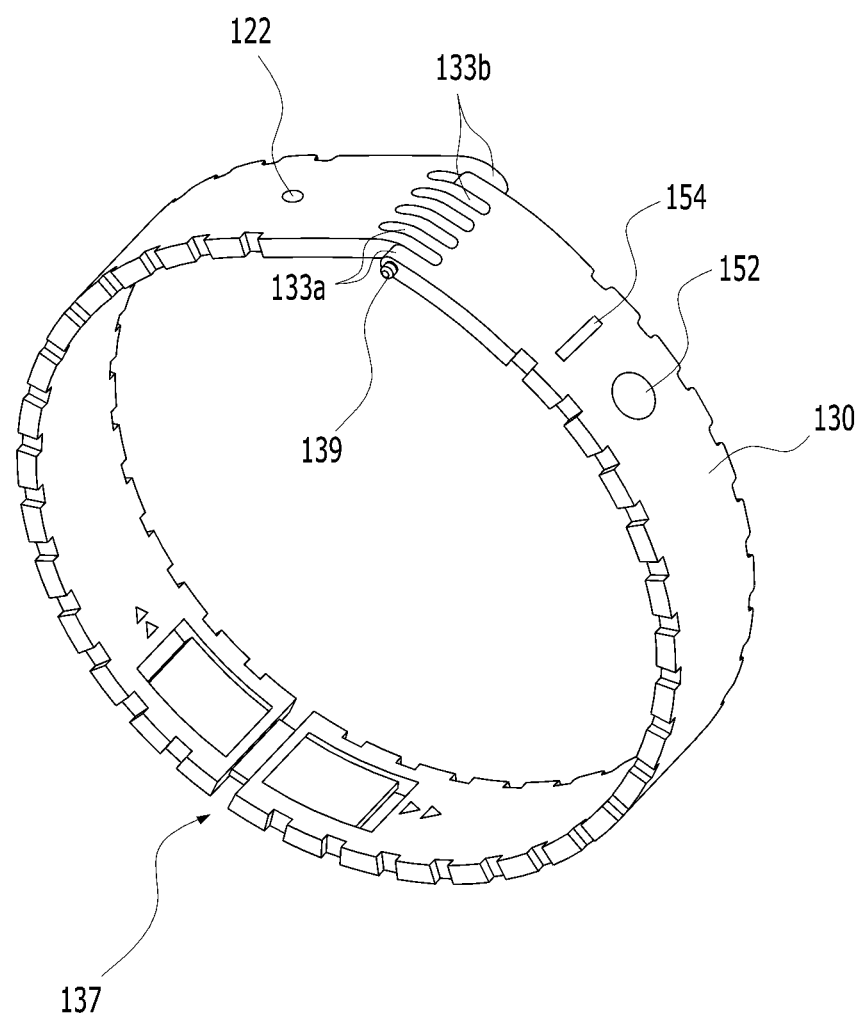
FIG. 8 is a perspective diagram illustrating the band of the smart bracelet in accordance with the embodiment of the present disclosure shown in FIG. 7.

FIG. 7 is an exploded perspective diagram illustrating a coupling portion between a watch module 101 and a band 130 of a smart bracelet in accordance with another embodiment. FIG. 8 is a perspective diagram illustrating the band 130 of the smart bracelet in accordance with the embodiment of the present disclosure shown in FIG. 7.

Referring to FIG. 7, the width of the slit 132 is equal to the width of the divided sides 133 divided by the slit 132. Even in this embodiment, a hinge pin 139 passes through a hinge hole 101b of the watch module 101 and coupling holes 134 formed in divided sides 133, respectively, so that the watch module 101 and the band 130 can be coupled to each other.

Projections 101c corresponding to the divided sides 133, respectively, may be formed between band coupling portions 101a of the watch module 101.

Even in this embodiment, each of the divided sides 133 may be bending alternatively in a reverse direction to be coupled to each other as shown in FIG. 6. As shown in FIG. 8, the divided sides 133 formed in one side of the other band 130 are inserted in the slit 132 formed in one side of the band 130 and the divided ends formed in the side of the band are inserted in the slit formed in the other side of the band, so that both ends of the band 130 can be coupled to each other, with forming one flat surface. In this instance, one hinge pin 139 may be used in coupling the ends of the band or two hinge holes 101b may be formed in each of the divided sides 133 so that two hinge pins 139 can be coupled to the hinge holes 101b side by side. In the embodiment, the coupling portion may be arranged alternatively in the traverse direction and the thickness of the band 130 may be advantageously uniform when the user wears only the band 130.

Figure 9:
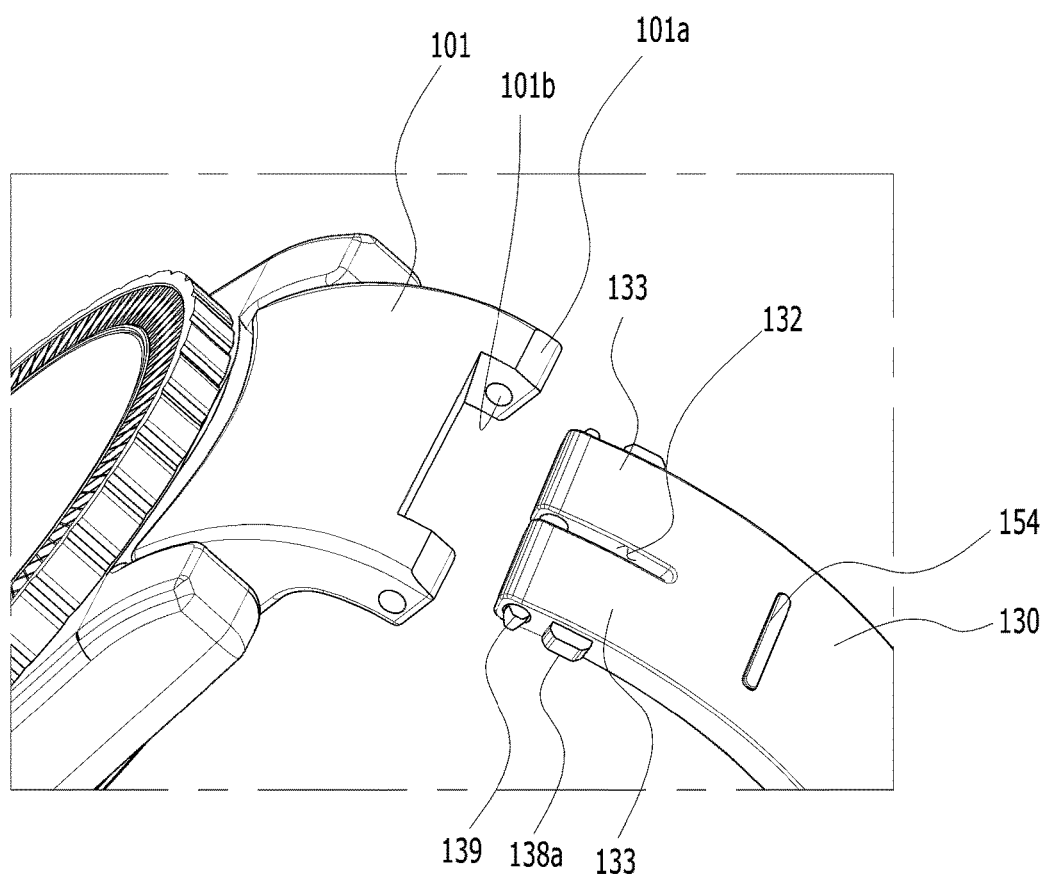
FIG. 9 is an exploded perspective diagram illustrating a band of a smart bracelet and a watch module in accordance with a further embodiment of the present disclosure.
Figure 10:
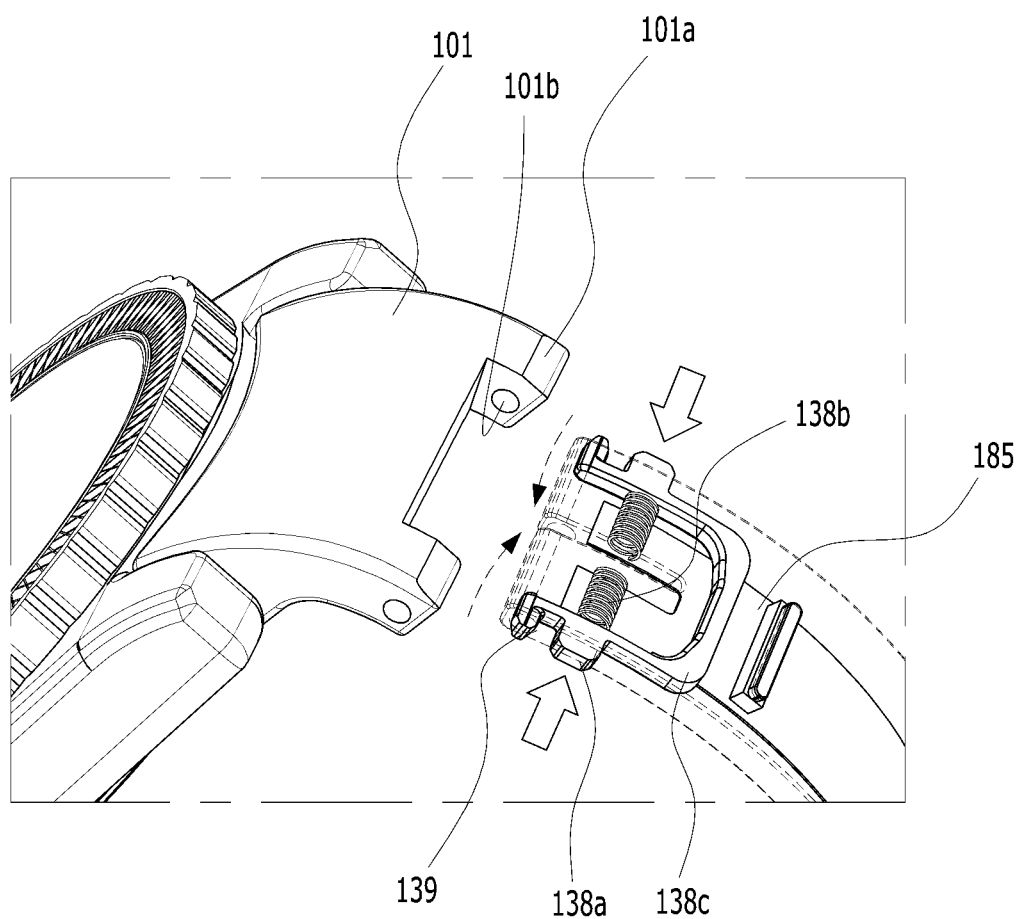
FIG. 10 is exploded perspective diagram illustrating a coupling portion between the watch module and the band of the smart bracelet in accordance with the embodiment shown in FIG. 9.
Figure 11:
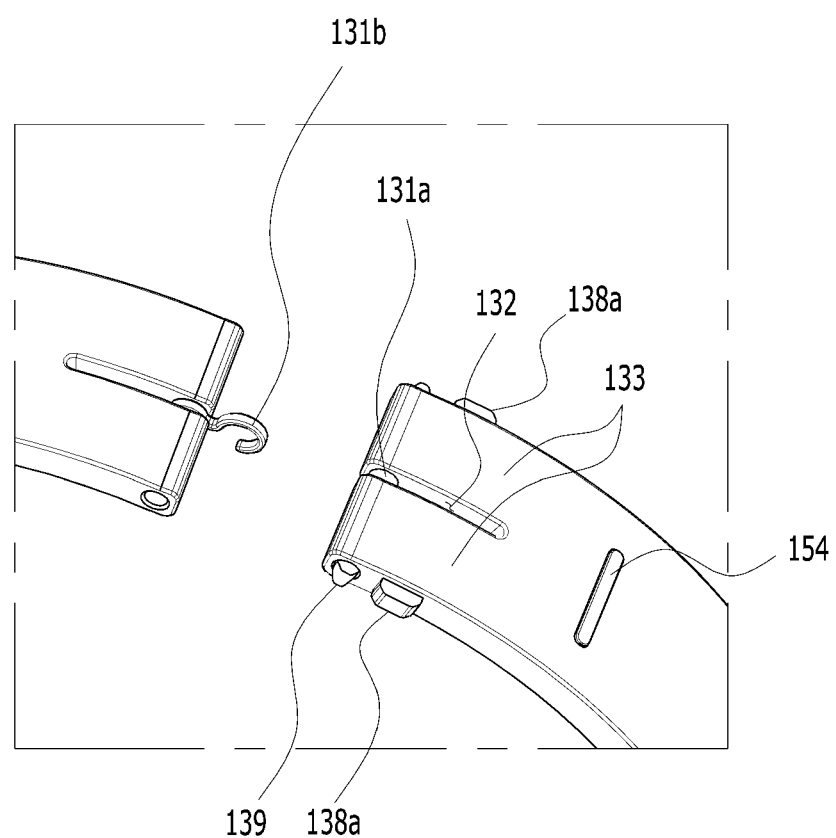
FIG. 11 is a perspective diagram illustrating coupling between both ends of the band of the smart bracelet in accordance with the embodiment shown in FIG. 9.

FIG. 9 is an exploded perspective diagram illustrating a band 130 of a smart bracelet and a watch module 101 in accordance with a further embodiment of the present disclosure. FIG. 10 is exploded perspective diagram illustrating a coupling portion between the watch module 101 and the band 130 of the smart bracelet in accordance with the embodiment shown in FIG. 9. FIG. 11 is a perspective diagram illustrating coupling between both ends of the band 130 of the smart bracelet in accordance with the embodiment shown in FIG. 9.

In the embodiment, the hinge pin 139 projected from the band 130 through the coupling hole 134 outwardly may be mounted in the band 130. The band 130 shown in FIG. 10 may be selectively exposed outside via the housing hole 134 by a flexible member 138b provided therein.

When a force is applied to the flexible member 138b through a button 138a by the user, the hinge pin 139 may be inserted in the coupling hole 134. Once the force applied to the flexible member is removed, the hinge pin 139 is projected. The hinge pin 139 may be exposed toward the coupling hole 134 from both ends of a U-shaped member 138c and the button 138a may be projected from the U-shaped member 138c in a lateral direction with respect to the band 130, adjacent to the hinge pin 139.

The U-shaped member 138c may be formed of a metallic or plastic material, with elasticity. Even without the flexible member 138b such as a spring, the hinge pin may be moved inwardly and outwardly, only using the U-shaped member 138c.

In case it is formed of a metallic material, the U-shaped member 138c may be functioned as a link unit 188 which is an electrical passage with the band printed circuit board 185. A predetermined portion (a central portion of the U-shape which is not moved often) of the U-shaped member 138c is connected to the band printed circuit board 185 and ends of the U-shaped member 138c may be electrically connected to the watch module 101 via the hinge pin 139.

In the embodiment, a hook 131b may be used in portions of coupling the band 130 to each other as shown in FIG. 11. A hooking portion 131a crossing the slit 132 is formed and the hook 131b is rotatably hooked to the hooking portion 131a formed in a portion of the band 130 and the hook 131b is selectively hooked to the hooking portion 131a formed in the other portion of the band, so that the ends of the band 130 can be coupled to each other. When the band 130 is coupled to the watch module 101, the hook 131b may be hidden in the slit 132 where the hooking portion 131a hooking the hook 131b thereto is provided.

Figure 12:
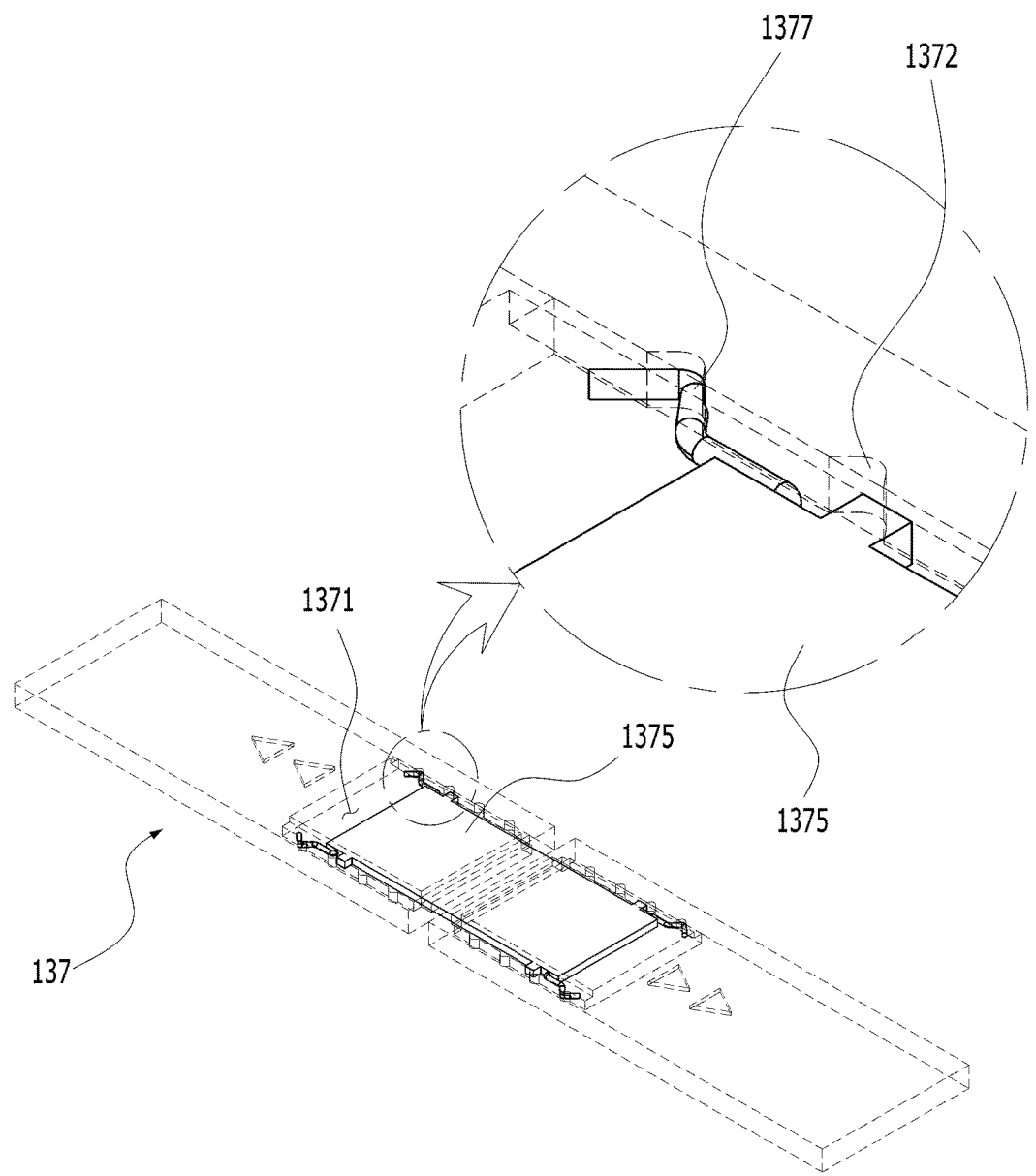
FIG. 12 is a perspective diagram illustrating a long adjusting unit of the smart bracelet in accordance with the embodiment shown in FIG. 2.

FIG. 12 is a perspective diagram illustrating a length adjusting unit 137 of the smart bracelet in accordance with one embodiment of the present disclosure. Every user may have a wrist with a different length so that the length adjusting unit 137 may be required to allow the bracelet fitted to every user's wrist. When only the band 130 is wound around the user's wrist after the watch module 101 is separated, the overall length is shortened and the shortened length can be increased, using the length adjusting unit 137.

The length adjusting unit 137 is divided into two pieces once a middle portion of the band is cut away. An auxiliary band 1375 may be provided between a first band 130 and a second band 130 as the divided two pieces, to be selectively disposed there between.

Each of the first and second bands 130 may have an auxiliary band accommodating portion 1371 to accommodate the auxiliary band 1375. Stopping grooves 1372 may be formed in right and left portions of the auxiliary band accommodating portion 1371 and stoppers 1377 may be formed in both sides of the auxiliary band 1375, to gradually accommodate the auxiliary band 1375.

Once the stopper 1377 is stopped to the stopping groove 1372, the movement of the auxiliary band 1375 is stopped and the length is fixed. The stopper 1377 shown in FIG. 12 may be formed of a flexible material, for example, a plate spring. When a force is additionally applied to the stopper 1377, the stopper 1377 is separated from the stopping groove 1372 and the auxiliary band 1375 is moved.

The auxiliary band 1375 shown in FIG. 12 may be exposed to an inside or outside of the band 130. When the length is not increased, the auxiliary band 1375 may be formed in the band 130 not to be exposed to the outside of the band 130.

Figure 13:
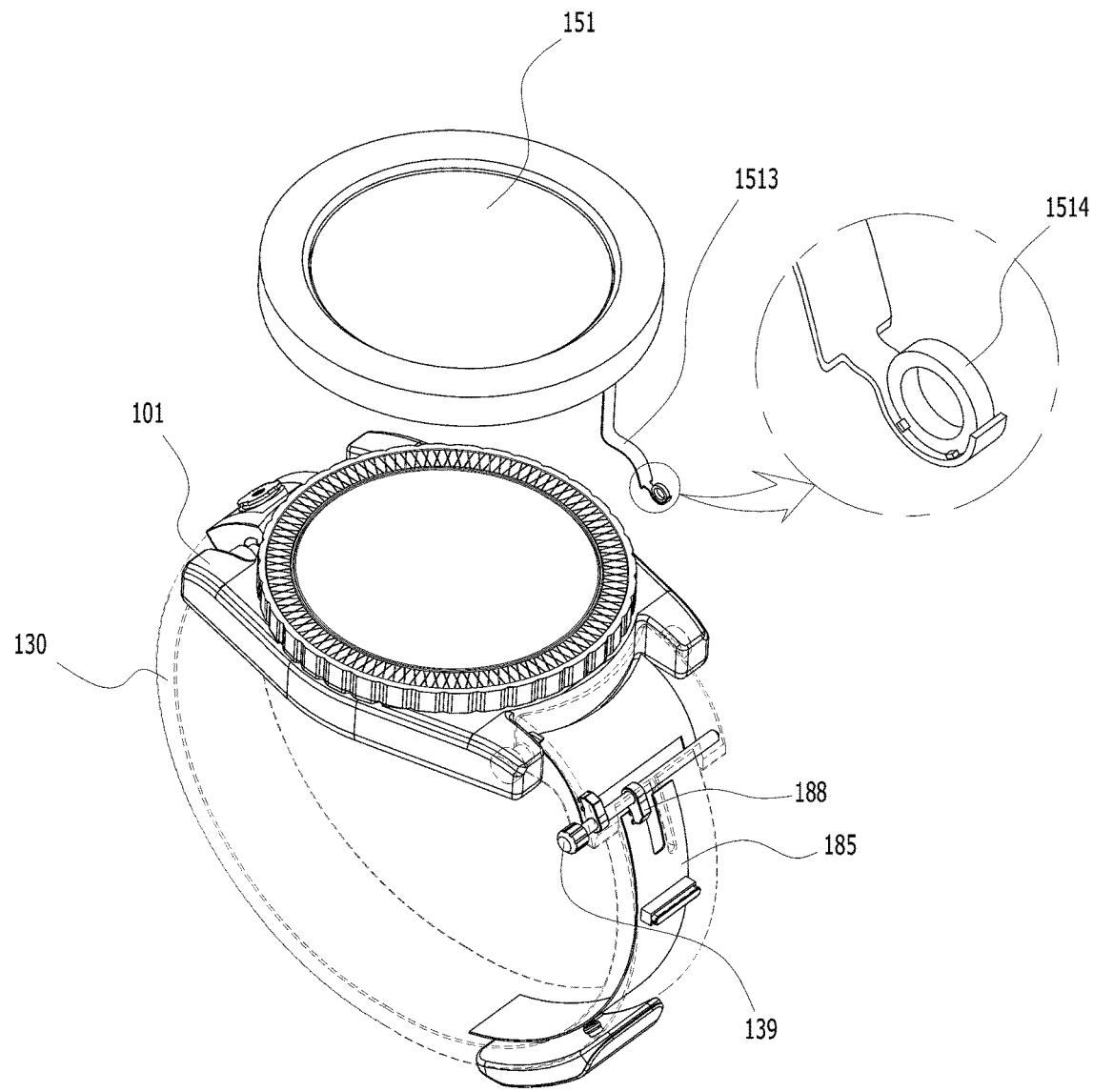
FIG. 13 is a perspective diagram illustrating a display unit of the smart bracelet in accordance with the embodiment shown in FIG. 2.
Figure 14:
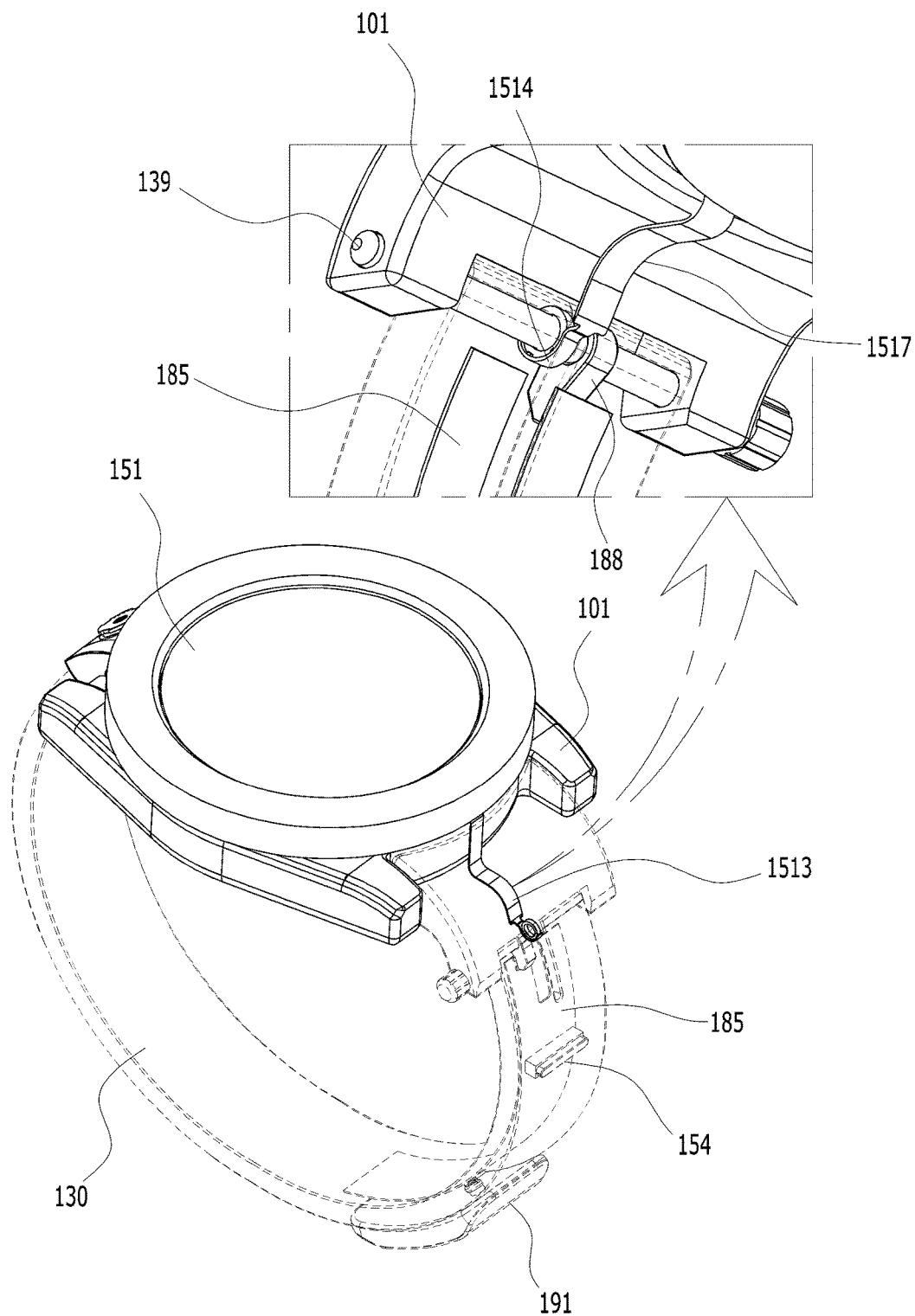
FIG. 14 is a diagram illustrating connection between the display unit of FIG. 13 and a flexible printed circuit board of the band.

FIG. 13 is a perspective diagram illustrating a display unit 151 of the smart bracelet in accordance with the embodiment shown in FIG. 2. FIG. 14 is a diagram illustrating connection between the display unit 151 of FIG. 13 and a flexible printed circuit board of the band.

The display 151 may be configured to cover the front surface of the watch module 101 or disposed to cover the clock face 102 of the watch module 101, replacing the glass covering the clock face 102. FIG. 13 illustrates the display unit 151 disposed to the watch module 101, without removing the glass, provided in the smart bracelet.

The display unit 151 includes a signal line 1513 for connecting the band printed circuit board 185 disposed in the band 130 to the watch module. The signal line 1513 may be coupled to the hinge pin 139 of the band 130, to be electrically connected to the band printed circuit board 185. The signal line 1513 shown in FIG. 13 may include a flexible printed circuit board extended from the display unit 151 and an interface ring 1514 inserted in the hinge pin 139.

As shown in FIG. 14, the interface ring 1514 is provided between slits 132 formed in the ends of the band 130 and it may be electrically connected with the band printed circuit board 185 when the hinge pin 139 is inserted in the coupling hole 134, so that the band printed circuit board 185 can control the display unit 151. The signal line 1513 may be extended along an outer surface of the watch module 101 or extended to the ends of the band 130 through a back side of the watch module 101 as shown in FIG. 14.

When using a detachable transparent display module, a conventional watch may be used as a multimedia device or terminal. The transparent display unit 151 may be used as a watch unless outputting image information and it may be opaque when outputting image information.

When the display unit 151 is connected with the band printed circuit board 185 by the signal line 1513 or to the watch module 101 having the display unit 151 disposed therein is connected to the band printed circuit board 185, the control unit may use the display unit 151 and activate an output function using the display unit 151.

For example, when receiving a text message, the text message may be output as a voice message via the audio output unit provided in the band 130 in a status where the user is wearing only the band 130. However, when the band is connected with the display unit 151, the text message may be output on the display unit 151.

When the user is wearing only the band 130, it is sensed that both ends of the band 130 are connected to each other. The interface rings 1514 provided in the coupling holes 134 formed in the portions of the band 130 are connected through the hinge pin 139 and it is recognized that the user is wearing only the band 130.

Figure 15:
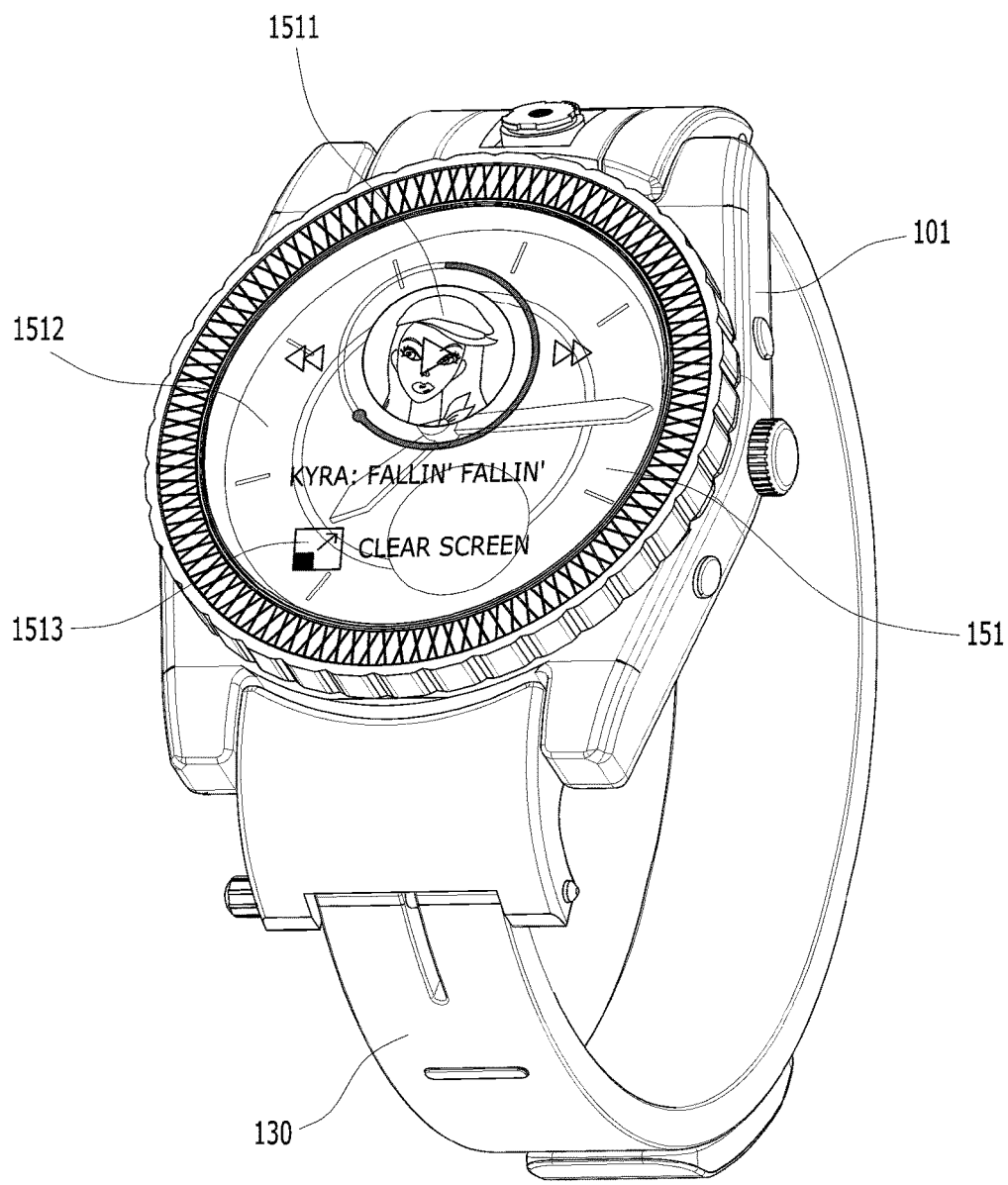
FIGS. 15 through 17 are diagrams illustrating the display unit of the smart bracelet in accordance with the embodiment shown in FIG. 2.
Figure 16:
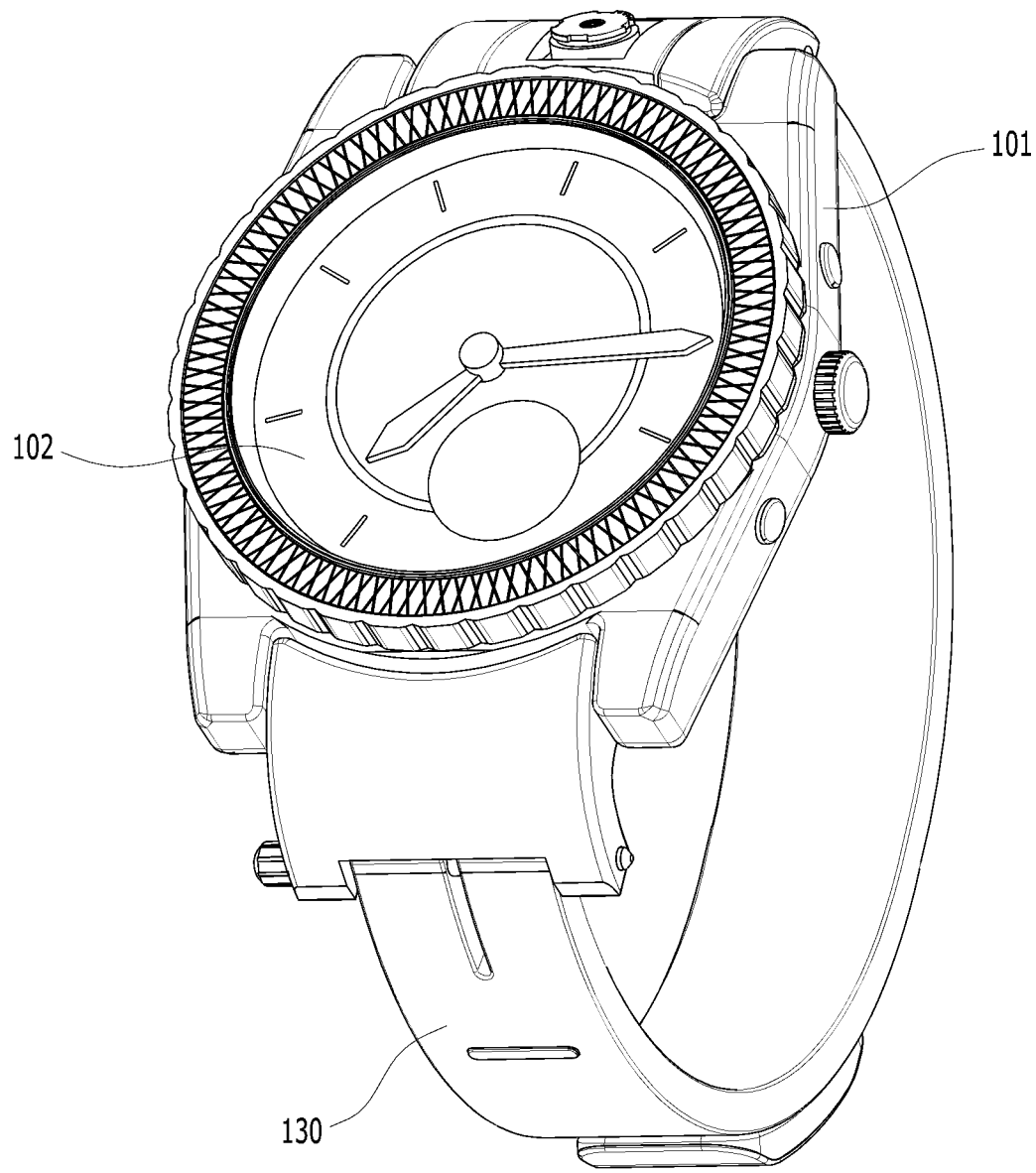
Figure 17:
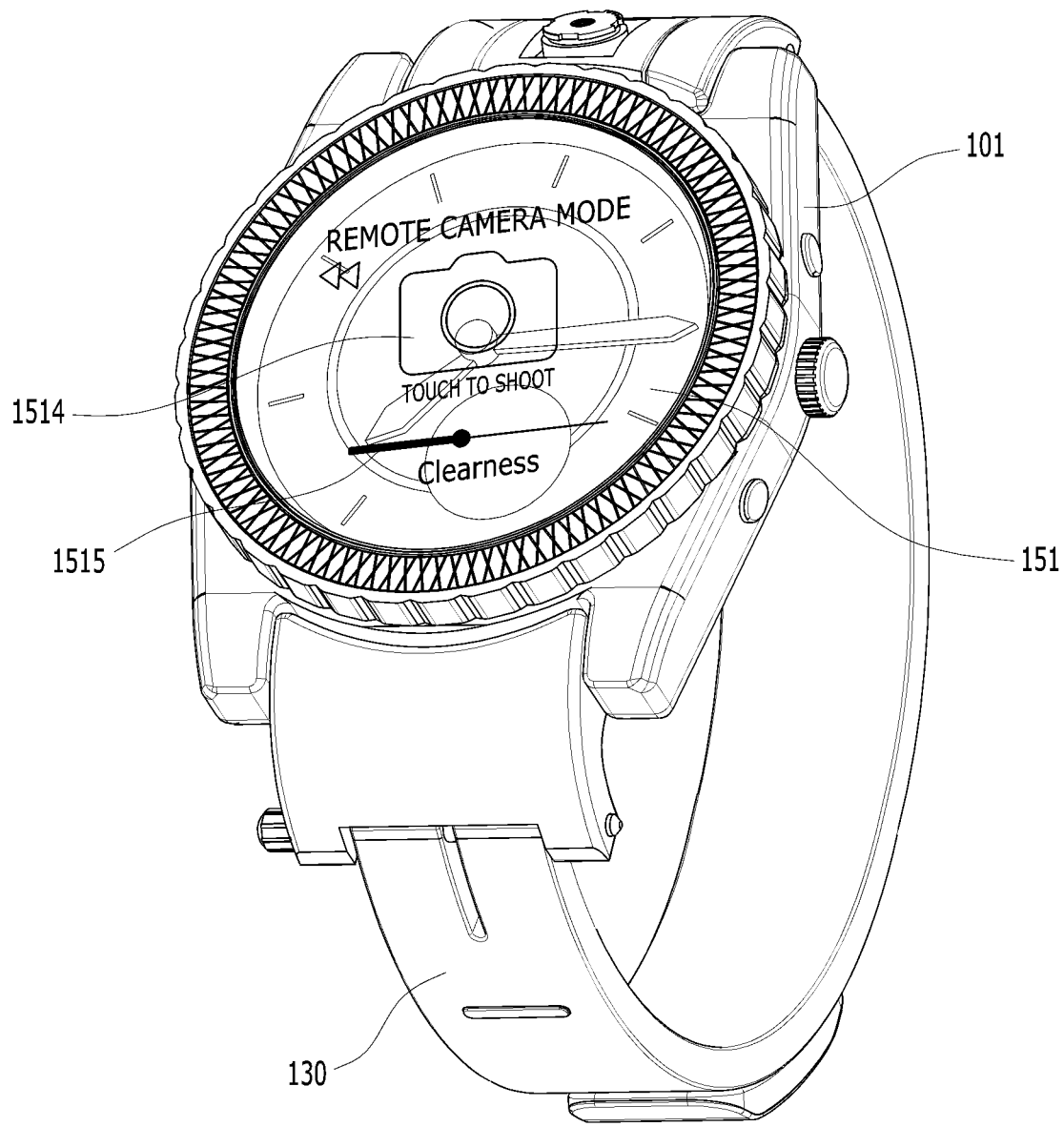

FIGS. 15 through 17 are diagrams illustrating the display unit 151 of the smart bracelet 100 in accordance with the embodiment shown in FIG. 2. The display unit 151 oriented-disposed in the watch module 101 is connected to the band and activated. The display unit additionally disposed in the watch module 101 is connected to the band and the IC 183 controls information to be displayed on the display unit 151.

The display unit 151 keeps its transparent status before outputting information. When outputting the information, the display unit 151 is changed from opaque to transparent, including degrees of translucence there between. The display unit 151 may be controlled so that an overall area of the display unit 151 may be opaque or that only an area outputting the information 1511 may be opaque or translucent and the other area may be transparent to make the clock face 103 visible partially as shown in FIG. 15.

The display unit 151 may be changed to be transparent status so as to use the display unit in a state where the clock face 103 is visible. An icon configured to change the display unit 151 into the transparent status may be output on the display unit 151 or a physical key may be used in controlling the display unit to be transparent so that the clock face 102 provided behind the transparent display unit 151 can be controlled to be visible.

Alternatively, as shown in FIG. 17, a transparency level of the information 1514 output on a screen may be controlled to make the clock face 102 disposed behind the display unit 151 visible to the user. A transparency display bar 151 may be output to control the transparency level.

Figure 18:
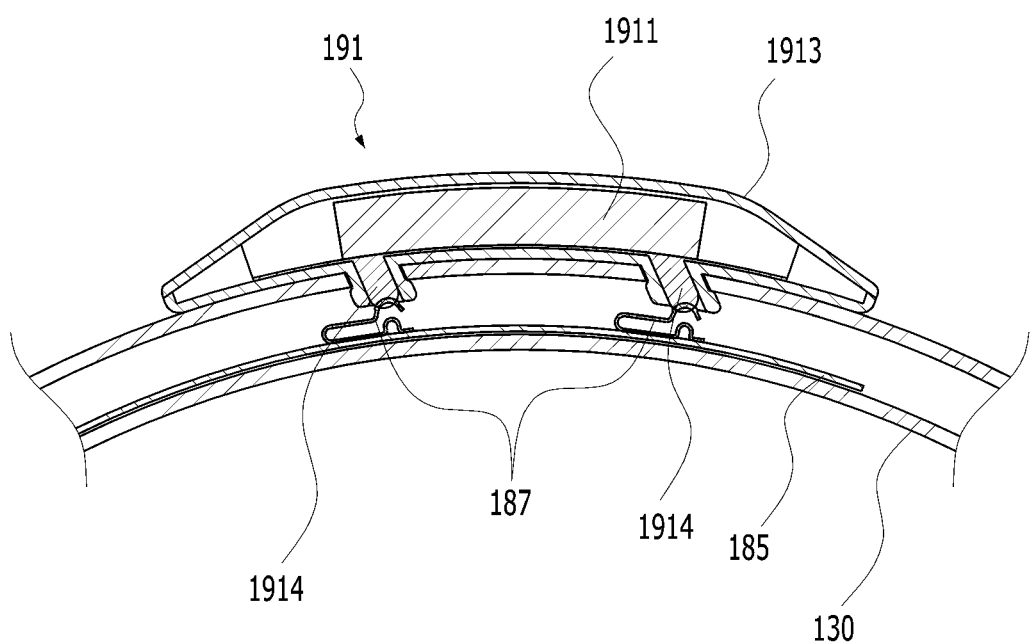
FIG. 18 is a sectional diagram illustrating a battery of the smart bracelet in accordance with the embodiment shown in FIG. 2.

FIG. 18 is a sectional diagram illustrating a battery 191 of the smart bracelet in accordance with the embodiment shown in FIG. 2. As shown in FIGS. 2 and 3, the battery 191 is detachably provided in the band 130. The battery 191 may be loaded in the band 130. In this instance, the size of the battery 191 is restricted and a replaceable battery may be provided.

A terminal hole is formed in the band 130 to couple the battery 191 thereto and a terminal projection 1914 is formed in the battery 191 to be forcedly coupled to the terminal hole. The terminal projection 1914 may contact with a flexible terminal 187 loaded in the band printed circuit board of the band 130 to supply a necessary power to the components loaded in the band 130. The flexible terminal 187 may be a plate spring, for example, a C-clip.

A battery cell 1911 may be loaded in a battery case 1913 defining an exterior appearance of the battery 191 and the opposite surface to a surface coupled to the band 130 may be a curved surface not to generate a step.

In accordance with at least one of the embodiments mentioned above, the smart bracelet may be attachable to the watch module so that the function of the smart bracelet can be expanded to be used as a smart mobile terminal, using the conventional accessory. In addition, the smart bracelet may be useable as other types changeable according to the watch module type and only the band may be used as the smart device.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A smart bracelet comprising:
a band having a curved surface extending in a longitudinal direction;
openings formed in a lateral surface of both ends of the band;
at least one hinge pin passing through the openings, the at least one hinge pin comprising a conductive material;
a band printed circuit board disposed in the band;
an integrated circuit (IC) installed on the band printed circuit board; and
a link unit connecting the band printed circuit board to the hinge pin,
wherein the state of the smart bracelet is transmutable between a first state wherein both ends of the band are connected each other and a second state wherein both ends of the band are connected to a watch module.

2. The smart bracelet of claim 1, wherein the link unit comprises:
an interface ring; and
an interface projection extending from the interface ring and contacting the band printed circuit board, wherein the hinge pin passes through and contacts the interface ring.

3. The smart bracelet of claim 1, wherein the opening is comprising a first opening formed through and extending in a transverse direction between a first lateral surface and a second lateral surface of a first end of the band, and a second opening is formed through and extends in a transverse direction between a first lateral surface and a second lateral surface of a second end of the band.

4. The smart bracelet of claim 3, wherein the band comprises a first slit extending from the first end in the longitudinal direction and a second slit extending from the second end in the longitudinal direction such that each of the first and second ends is divided into a first side and a second side,
wherein the first end and the second end overlap each other such that the first side of the first end overlays the first side of the second end and the second side of the first end underlays the second side of the second end, whereby the first side of the first end is positioned side-by-side to the second side of the second end and the second side of the first end is side-by-side to the first side of the second end, and
wherein the hinge pin is comprising a first hinge pin that passes, in a transverse direction, through the opening through the first side of the first end and the opening through the second side of the second end, and a second hinge pin passes, in a transverse direction, through the opening through the second side of the first end and the opening through the first side of the second end, thereby attaching the first end to the second end.

5. The smart bracelet of claim 4 further comprising an audio output unit,
configured to output an audio signal based on an audio input signal and a voice message based on a text input signal when the hinge pin inserts through the opening.

6. The smart bracelet of claim 1 further comprising:
a button in mechanical communication with the hinge pin, wherein the hinge pin and the button are configured such that operation of the button causes the hinge pin to selectively retract into the band or project out of the band through the opening.

7. The smart bracelet of claim 6 further comprising:
an elastic member in mechanical communication with the button and the hinge pin, wherein the elastic member, the button and the hinge pin are configured such that a pressing force on the button causes the elastic member to contract and exert a first force on the hinge pin whereby the hinge pin retracts into the band, and configured such that when the pressing force on the button is removed the elastic member exerts a second force on the hinge pin whereby the hinge pin projects out of the band through the opening.

8. The smart bracelet of claim 7, wherein the link unit is a plate spring having a U-shape, and the hinge pin projects from an end portion of the link unit through the opening, and wherein the button projects from a side portion of the link unit through a second opening in a lateral surface of the band.

9. The smart bracelet of claim 8, wherein the hinge pin comprises a first hinge pin part and a second hinge pin part, the first hinge pin part projecting from a first end portion of the link unit through the opening in a first lateral surface of the band and the second hinge pin part projecting from a second end portion of the link unit through an opening in a second lateral surface of the band,
wherein the button is comprises a first button projecting from a first side portion of the link unit through the second opening in the first lateral surface of the band and a second button projects from a second side portion of the link unit through the second opening in the second lateral surface of the band.

10. The smart bracelet of claim 6 further comprising:
a hooking portion associated with a first end of the band; and
a hook associated with a second end of the band, the hook being configured to rotatably couple to and de-couple from the hooking portion.

11. The smart bracelet of claim 1, wherein the opening is formed through and extends in a transverse direction between a first lateral surface and a second lateral surface of the one end of the band, and wherein the hinge pin extends through the opening and the first and second lateral surfaces of the one end of the band,
wherein the watch module comprises a clock face and a band coupling portion configured to couple to the band via the hinge pin, and
wherein the band coupling portion comprises:
a pair of band coupling projections spaced apart a distance corresponding to the width of the band; and
a hinge hole formed in each of the band coupling projections, wherein each hinge hole is configured to receive a corresponding one of the ends of the hinge pin.

12. The smart bracelet of claim 11 further comprising:
a display unit coupled to a front surface of the clock face, wherein the IC is configured to control the amount of light that passes through the display unit so that the display unit ranges from opaque to transparent, including degrees of translucence there between, and to control the display unit to output image information.

13. The smart bracelet of claim 12, wherein the IC is further configured to control the display unit such that a first amount of light passes through a first area of the display unit, and that a second amount of light passes through a second area of the display unit.

14. The smart bracelet of claim 12, wherein the display unit is detachable from the watch module.

15. The smart bracelet of claim 14 further comprising a signal line connecting the display unit to the hinge pin.

16. The smart bracelet of claim 12 further comprising:
an audio output unit coupled to the band,
wherein the display unit is configured to output image information or text information and
wherein the audio output unit is configured to output an audio signal based on an audio input signal or a voice message based on a text input signal.

17. The smart bracelet of claim 1, wherein the band comprises:
a first band and a second band; and
a length adjusting unit between the first band and the second band, wherein the length adjusting unit is configured to adjust the length of the band.

18. The smart bracelet of claim 17, wherein the length adjusting unit comprises:
an auxiliary band; and
an auxiliary band accommodating portion formed in each of the first and second bands, the auxiliary band accommodating portion of the first band and the auxiliary band accommodating portion of the second band configured to receive a first end and a second end of the auxiliary band, respectively, wherein each end of the auxiliary band comprises a stopper and wherein each of the first and second auxiliary band accommodation portions comprises one or more stopping grooves configured to receive a stopper.

19. The smart bracelet of claim 1 further comprising:
a battery detachably provided in an outer surface of the band, wherein the battery comprises a terminal projection, wherein the outer surface of the band has a terminal projection hole formed therein, and wherein the band printed circuit board comprises a flexible terminal configured to connect with the terminal projection.

* * * * *